United States Patent
Guerraz et al.

(10) Patent No.: US 7,720,848 B2
(45) Date of Patent: May 18, 2010

(54) HIERARCHICAL CLUSTERING WITH REAL-TIME UPDATING

(75) Inventors: Agnes Guerraz, Le Gua (FR); Caroline Privault, Montbonnot (FR); Cyril Goutte, Ottawa (CA); Eric Gaussier, Eybens (FR); Francois Pacull, Crolles (FR); Jean-Michel Renders, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 587 days.

(21) Appl. No.: 11/391,864

(22) Filed: Mar. 29, 2006

(65) Prior Publication Data
US 2007/0239745 A1    Oct. 11, 2007

(51) Int. Cl.
G06F 7/00    (2006.01)
G06F 17/00    (2006.01)
(52) U.S. Cl. .................. 707/737; 707/739; 707/999.101
(58) Field of Classification Search ........... 707/E17.089
See application file for complete search history.

(56) References Cited

U.S. PATENT DOCUMENTS

| | | | |
|---|---|---|---|
| 5,551,028 A * | 8/1996 | Voll et al. ............... 707/103 R |
| 6,233,575 B1 * | 5/2001 | Agrawal et al. ............... 707/6 |
| 6,389,436 B1 * | 5/2002 | Chakrabarti et al. ........ 715/229 |
| 6,393,427 B1 * | 5/2002 | Vu et al. ..................... 707/101 |
| 6,424,971 B1 | 7/2002 | Kreulen et al. |
| 6,804,688 B2 * | 10/2004 | Kobayashi et al. .......... 707/203 |
| 7,016,895 B2 * | 3/2006 | Dehlinger et al. .............. 707/5 |
| 7,139,754 B2 * | 11/2006 | Goutte et al. .................. 707/4 |
| 7,197,504 B1 * | 3/2007 | Runkler et al. ............. 707/102 |
| 7,231,393 B1 * | 6/2007 | Harik et al. ................. 707/100 |
| 7,280,957 B2 * | 10/2007 | Newman et al. ................ 704/9 |
| 7,296,020 B2 * | 11/2007 | Gerstl et al. ................... 707/7 |
| 7,409,404 B2 * | 8/2008 | Gates ......................... 707/102 |
| 2003/0101187 A1 | 5/2003 | Gaussier et al. |
| 2003/0128236 A1 * | 7/2003 | Chen ........................... 345/745 |
| 2004/0111438 A1 * | 6/2004 | Chitrapura et al. .......... 707/200 |
| 2004/0117340 A1 * | 6/2004 | Blitzer .......................... 707/1 |
| 2004/0125124 A1 * | 7/2004 | Kim et al. .................... 345/716 |
| 2004/0181553 A1 * | 9/2004 | Stockfisch ............... 707/104.1 |
| 2004/0181554 A1 * | 9/2004 | Heckerman et al. ...... 707/104.1 |
| 2004/0267709 A1 * | 12/2004 | Ji et al. .......................... 707/3 |
| 2005/0010580 A1 * | 1/2005 | Lancefield ................... 707/100 |
| 2005/0187892 A1 | 8/2005 | Goutte et al. |
| 2007/0179944 A1 * | 8/2007 | Van Dyke Parunak et al. .. 707/5 |

(Continued)

OTHER PUBLICATIONS

Vinokourov et al., "A Probabilistic Framework for the Hierarchic Organisation and Classification of Document Collections," Journal of Intelligent Information Systems, vol. 19, No. 2-3, pp. 153-172, 2002.

(Continued)

*Primary Examiner*—Mohammad Ali
*Assistant Examiner*—Griselle Corbo
(74) *Attorney, Agent, or Firm*—Fay Sharpe LLP

(57) ABSTRACT

A probabilistic clustering system is defined at least in part by probabilistic model parameters indicative of word counts, ratios, or frequencies characterizing classes of the clustering system. An association of one or more documents in the probabilistic clustering system is changed from one or more source classes to one or more destination classes. Probabilistic model parameters characterizing classes affected by the changed association are locally updated without updating probabilistic model parameters characterizing classes not affected by the changed association.

13 Claims, 6 Drawing Sheets

U.S. PATENT DOCUMENTS

| | | | |
|---|---|---|---|
| 2007/0208772 A1* | 9/2007 | Harik et al. | 707/102 |
| 2008/0154926 A1* | 6/2008 | Newman | 707/100 |
| 2008/0172402 A1* | 7/2008 | Birdwell et al. | 707/101 |
| 2008/0215314 A1* | 9/2008 | Spangler | 704/10 |
| 2009/0030864 A1* | 1/2009 | Pednault et al. | 706/45 |

OTHER PUBLICATIONS

Jain et al., "Data clustering: a review," ACM Computing Surveys, ACM, vol. 31, No. 3, pp. 264-323, 1999.

Can, "Incremental Clustering for Dynamic Information Processing," ACM Transactions on Information Systems, ACM, vol. 11, No. 2, pp. 143-164, 1993.

Gaussier et al., "A hierarchical model for clustering and categorising documents," Advances in Information Retrieval—Proceedings of the $24^{th}$ BCS-IRSG European Colloquium on IR Research (ECIR-02), Lecture Notes in Computer Science 2291, pp. 229-247, (Spring 2002).

Spangler et al, "Interactive Methods for Taxonomy Editing and Validation," Proc. of $11^{th}$ Int'l. Conf. on Information and Knowledge Management Table of Contents, McLean, VA, USA, pp. 665-668, (2002).

Basu et al., "Semi-supervised Clustering by Seeding," Proceedings of the $19^{th}$ International Conference on Machine Learning (ICML-2002), pp. 19-26, Sydney, Australia, (Jul. 2002).

Bilenko et al., "Integrating Constraints and Metric Learning in Semi-Supervised Clustering," Proceedings of the $21^{st}$ International conference on Machine Learning, (ICML-2004), pp. 81-88, Banff, Canada, Jul. 2004.

Basu et al., "Probabilistic Semi-supervised Clustering with Constraints," Journal of Machine Learning Research, pp. 1-34, to appear in MIT Press (2005).

Demiriz et al., "Semi-Supervised Clustering Using Genetic Algorithms," Proc. of Artificial Neural Networks in Engineering, (ANNIE '99), Nov. 1999.

Klein et al., "From Instance-level Constraints to Space-level Constraints: Making the Most of . . . ," Proc. $19^{th}$ Int. Conf. on Machine Learning, ICML-2002, (2002).

Kulis et al., "Semi-supervised Graph Clustering: A Kernel Approach," Proc. $22^{nd}$ Int. conf. on Machine Learning (ICML-2005), pp. 457-464 (Bonn, Germany, 2005).

Lu et al., "Penalized Probabilistic Clustering," Advances in Neural Information Processing, (NIPS) 2004.

Wagstaff et al., "Constrained K-means Clustering with Background Knowledge," Proceedings of the $18^{th}$ Int. Conf. on Machine Learning, pp. 577-584, 2001.

Wagstaff et al., "clustering with Instance-level Constraints," Proceedings of the $17^{th}$ Int. Conf. on Machine Learning, pp. 1103-1110, 2000.

U.S. Appl. No. 11/013,365, filed Dec. 15, 2004, Goutte et al.

U.S. Appl. No. 11/170,033, filed Jun. 29, 2005, Gaussier et al.

U.S. Appl. No. 11/170,019, filed Jun. 29, 2005, Goutte et al.

U.S. Appl. No. 11/312,764, filed Dec. 20, 2005, Goutte.

Cody et al., "The integration of business intelligence and knowledge management," IBM Systems Journal, vol. 41, No. 4, pp. 697-713, 2000.

Spiliopoulou, Myra, "Ontology enhancement with fine-grained text mining," Data-Mining-CUP, Chemnitz vom 14-16, pp. 1-18, 2005.

\* cited by examiner

HIERARCHICAL CLUSTERING WITH REAL-TIME UPDATING

BACKGROUND

The following relates to the document processing arts. It is described with example reference to embodiments employing probabilistic hierarchical clustering in which documents are represented by a bag-of-words format. However, the following is also applicable to non-hierarchical probabilistic clustering, to other types of clustering, and so forth.

In typical clustering systems, a set of documents is processed by a training algorithm that classifies the documents into various classes based on document similarities and differences. For example, in one approach the documents are represented by a bag-of-words format in which counts are stored for keywords or for words other than certain frequent and typically semantically uninteresting stop words (such as "the", "an", "and", or so forth). Document similarities and differences are measured in terms of the word counts, ratios, or frequencies, and the training partitions documents into various classes based on such similarities and differences. The training further generates probabilistic model parameters indicative of word counts, ratios, or frequencies characterizing the classes. For example, a ratio of the count of each word in the documents of a class respective to the total count of words in the documents of the class provides a word probability or word frequency modeling parameter. Optionally, the classes are organized into a hierarchy of classes, in which the documents are associated with leaf classes and ancestor classes identify or associate semantically or logically related groupings of leaf classes. Once the training is complete, the clustering system can be used to provide a convenient and intuitive interface for user access to the clustered documents.

A problem arises, however, in that the classification system generated by the initial cluster training is generally static. The probabilistic modeling parameters are computed during the initial training based on counting numbers of words in documents and classes. If a document in the clustering system is moved from one class to another class, or if a class is split or existing classes are merged, or so forth, then the probabilistic modeling parameters computed during the training are no longer accurate.

To maintain up-to-date probabilistic modeling parameters, the clustering system can be retrained after each update (such as after each document or class move, after each class split or merge, or so forth). However, a large clustering system may contain tens or hundreds of thousands of documents, or more, with each document containing thousands, tens of thousands, or more words. Accordingly, re-training of the clustering system is typically a relatively slow proposition. For document bases of tens of hundreds of documents each including thousands or tens of thousands of words, retraining can take several minutes or longer. Such long time frames are not conducive to performing real-time updates of the hierarchy of classes. Moreover, the effect of such retraining will generally not be localized to the moved documents or classes that have been moved, merged, split, or otherwise updated. Rather, a retraining of the clustering system to account for updating of one region of the hierarchy of classes may have unintended consequences on other regions that may be far away from the updated region.

CROSS REFERENCE TO RELATED APPLICATIONS

The following related U.S. patent applications that commonly owned with the present application are each incorporated herein by reference:

Gaussier et al., U.S. application Ser. No. 09/982,236 filed Oct. 19, 2001 and published as U.S. Publ. Appl. No. 2003/0101187 A1 on May 29, 2003, is incorporated herein by reference in its entirety. This application relates at least to soft hierarchal clustering.

Goutte et al., U.S. application Ser. No. 10/774,966 filed Feb. 9, 2004 and published as U.S. Publ. Appl. No. 2005/0187892 A1 on Aug. 25, 2005, is incorporated herein by reference in its entirety. This application relates at least to multi-class, multi-label categorization using probabilistic hierarchal modeling.

Goutte et al., U.S. application Ser. No. 11/013,365 filed Dec. 15, 2004 is incorporated herein by reference in its entirety. This application relates at least to categorization decision-making.

Gaussier et al., U.S. application Ser. No. 11/170,033 filed Jun. 29, 2005 is incorporated herein by reference in its entirety. This application relates at least to multiple-view categorization.

Goutte et al., U.S. application Ser. No. 11/170,019 filed Jun. 29, 2005 is incorporated herein by reference in its entirety. This application relates at least to incremental training of a probabilistic classifier.

Goutte, U.S. application Ser. No. 11/312,764 filed Dec. 20, 2005 is incorporated herein by reference in its entirety. This application relates at least to techniques for determining class descriptors.

BRIEF DESCRIPTION

According to certain aspects illustrated herein, there is provided a method for updating a probabilistic clustering system defined at least in part by probabilistic model parameters indicative of word counts, ratios, or frequencies characterizing classes of the clustering system. An association of one or more documents is changed from one or more source classes to one or more destination classes. Probabilistic model parameters characterizing classes affected by the changed association are locally updated without updating probabilistic model parameters characterizing classes not affected by the changed association.

According to certain aspects illustrated herein, there is provided a method, for use in a clustering system in which each document is represented as a bag-of-words, for splitting a pre-existing class into two or more split leaf classes. A plurality of documents associated with the pre-existing class are defined as a document group that is to be kept together. The plurality of documents of the document group are replaced with a temporary document having a bag-of-words representation that combines word counts of the documents of the document group. Clustering is performed to associate each document of the pre-existing leaf class, including the temporary document, with one of the two or more split leaf classes. The clustering is limited to documents associated with the pre-existing leaf class. After the clustering, the temporary document is replaced with the plurality of documents of the document group, each of the plurality of documents being associated with the same split leaf class with which the temporary document was associated by the clustering.

According to certain aspects illustrated herein, there is provided a probabilistic clustering system operating in conjunction with documents grouped into classes characterized by probabilistic model parameters indicative of word counts, ratios, or frequencies. A user interface is configured to receive a user selection of a change of association of one or more documents from one or more source classes to one or more destination classes. A processor is configured to locally update probabilistic model parameters characterizing classes affected by the changed association without updating probabilistic model parameters characterizing classes not affected by the changed association.

DETAILED DESCRIPTION

Figure 1:
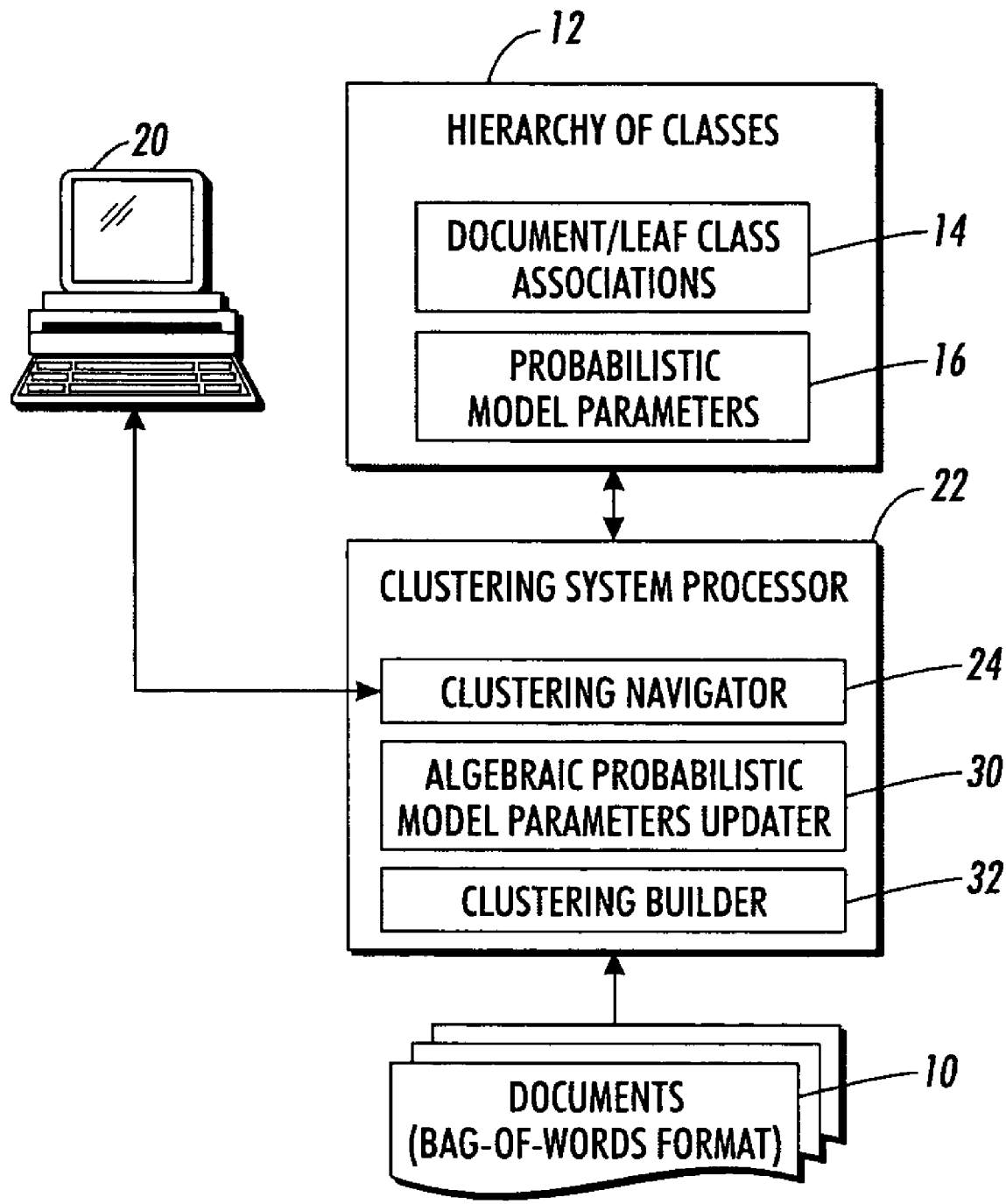
FIG. 1 diagrammatically shows a clustering system including real-time-hierarchy updating.

With reference to FIG. 1, a clustering system is described. The clustering system is a probabilistic clustering system that organizes set of documents 10 to generate a hierarchy of classes 12. Alternatively, in some embodiments a flat set of classes is generated. The hierarchy of classes 12 include document/leaf class associations 14 indicating which of the documents 10 is associated with which leaf classes of the hierarchy of classes 12. (In the art the term "class" is used, or an alternative but substantive equivalent term such as "cluster" or "category" is used. The term "class" as used herein is intended to be broadly construed to encompass the terms "cluster" or "category" as well). In some embodiments, the document/leaf class associations 14 are annotated to the documents. Each document of the set of documents 10 is suitably represented in a bag-of-words format. In the bag-of-words format, the position of words in the document is not utilized. Rather, a word-frequency vector or similar format is used, in which the document is represented by counts of keywords or of words other than certain frequent and typically semantically uninteresting stop words (such as "the", "an", "and", or so forth). The specific format used can vary—for example, the bag-of-words representation optionally has the counts normalized by the total number of words in the document, or the total number of non-stop words in the document, or so forth.

The hierarchy of classes 12 also includes a set of probabilistic modeling parameters 16 indicative of word counts, ratios, or frequencies that characterize the classes. The example illustrated clustering system employs a probabilistic model. The hierarchy of classes 12 includes leaf classes associated directly with documents. Optionally, the hierarchy further includes one or more ancestor classes which do not themselves contain any documents but which are ancestral to leaf documents that contain documents. The hierarchy of classes 12 optionally includes more than one level of ancestor classes. In an example embodiment, the probabilistic modeling parameters 16 that characterize the classes include: a class probability $P(C)$ for each class $C$ that is indicative of a ratio of the count of words in documents of the class $C$ respective to a total count of words in the set of documents 10; a document probability $P(d|C)$ that is indicative of a ratio of the count of words in the document $d$ in the class $C$ respective to the total count of words in the class $C$ (for hard partitioning, $P(d|C)=0$ if the document $d$ is not associated with the class $C$, and $P(d|C)$ is indicative of the influence of document $d$ on class $C$ if document $d$ is associated with class $C$); a word probability $P(w|C)$ that is indicative of a ratio of the count of word $w$ in the class $C$ respective to the total count of words in class $C$. In the illustrated embodiments, hard partitioning is used. However, it is also contemplated to employ soft partitioning in which a given document may have fractional associations with more than one class.

The example probabilistic model parameters $P(C)$, $P(d|C)$, and $P(w|C)$ are illustrative and non-limiting. Other suitable probabilistic model parameters may be defined instead of or in addition to these. Moreover, in some embodiments, clustering may be performed using a non-probabilistic clustering technique such as k-means, latent semantic indexing or hierarchical agglomerative methods.

The hierarchy of classes 12 is typically initially generated using a suitable training approach. In some embodiments, a maximum likelihood approach such as expectation-maximization (EM) or gradient descent is used to perform the training of the probabilistic clustering model. The training generates the probabilistic modeling parameters 16 based on the document/leaf class associations 14 obtained during a training phase. Leaf classes of the hierarchy are directly associated with documents. Intermediate classes from which leaf classes depend either directly or indirectly also have associated probabilistic modeling parameters such as the example probabilities $P(c)$, $P(d|c)$ and $P(w|c)$ (where lower-case "c" here indicates a non-leaf class). In one suitable approach for non-leaf classes, $P(c)=0$ for all non-leaf classes $c$, indicating that no documents are directly contained by the non-leaf class $c$, and $P(d|c)$ and $P(w|c)$ are the weighted averages of the corresponding parameters of its children or descendents, that is:

$$P(w|c) = \frac{\sum_{C \downarrow c} P(w|C) \cdot P(C)}{\sum_{C \downarrow c} P(C)}, \quad (1)$$

where $C \downarrow c$ indicates $C$ is a descendent of $c$, and

-continued $$P(d\mid c) = \frac{\sum\limits_{C\downarrow c} P(d\mid C)\cdot P(C)}{\sum\limits_{C\downarrow c} P(C)}, \qquad (2)$$

where $C\downarrow c$ indicates $C$ is a descendent of $c$.

Once the clustering system is trained, a user interface 20 can be used by a user to communicate with a processor 22 that implements a clusters navigator 24 so as to navigate the clustering system. In some embodiments, the user interface is a graphical user interface (GUI) providing, for example: a window showing a tree representation of the hierarchy of classes, optionally configured so that various branches can be expanded or collapsed to focus in on regions of interest; a document window for displaying a selected document; and so forth. Optionally, various windows can be opened and closed using suitable menu options, mouse selections, or other user input mechanisms of the graphical user interface. As long as the user is merely viewing documents, searching for documents, or performing other read-only cluster system navigation operations, the clustering system is static and the hierarchy of classes 12 is unchanged.

However, the user may decide to change the association of one or more documents from one or more source classes to one or more destination classes. In one example association change, the user chooses to move a single document from one class into another class. (See example FIG. 2). In another example association change, the user moves a leaf class from one ancestor class to another ancestor class, and in the process moves the documents associated with the moved leaf class. (See example FIG. 3). In another example association change, the user merges two or more leaf classes to form a merged leaf class, and in the process moves the documents associated with the original leaf class into the merged leaf class. (See example FIG. 4). In another example association change, the user merges two or more leaf classes by inserting a new ancestor class so as to be the immediate ancestor to the two or more leaf classes to be merged, and in the process moves the documents to be indirectly off of the new ancestor class. (See example FIG. 5). In another example association change, the user splits a pre-existing leaf class into two or more split leaf classes that replace the pre-existing leaf class, and in the process moves the documents associated with the pre-existing leaf class into the split leaf classes. (See example FIG. 6). In another example association change, the user performs a split by transferring documents of a pre-existing leaf classes into two or more split leaf classes that are created immediately descendant to the pre-existing leaf class, and in the process moves the documents associated with the pre-existing leaf class into the new split leaf classes. (See example FIG. 7).

Each of these example association changes impacts the hierarchy of classes 12 including the probabilistic modeling parameters 16. If no new classes are created (for example, in the move operations of FIGS. 2 and 3), the effect is to change values of certain probabilistic modeling parameters 16. When new or different classes are created (for example, in the merge and split operations of FIGS. 4-7), values of existing probabilistic modeling parameters 16 may change and additionally new probabilistic modeling parameters are created and/or deleted. Advantageously, however, the clustering system of FIG. 1 includes the processor 22 that, in addition to implementing or including components for the clusters navigator 24, also implements or includes components for locally updating probabilistic model parameters characterizing those classes that are affected by the changed association without updating probabilistic model parameters that characterize classes not affected by the changed association. As will be described herein, in move and merge operations an algebraic probabilistic modeling parameters updater 30 implemented by the processor 22 can locally update the probabilistic model parameters 12 algebraically, without invoking cluster training. For split operations, a clustering builder 32 implemented by the processor 22 is used to split documents amongst the split leaf classes. The clustering operates only on the documents associated with the pre-existing class that is being split. The clustering builder 32 may employ a maximum likelihood probabilistic clustering algorithm such as an expectancy maximization (EM) algorithm, a gradient descent algorithm, or so forth, to perform the limited cluster training. Typically, the clustering builder 32 is the same algorithm or component used to perform the initial cluster training on the complete set of documents 10 to create the clustering system; however, during a subsequent split operation the clustering builder 32 is applied only to the documents associated with the pre-existing class that is being split.

An advantage of performing local updating using the components 30, 32 is that these updates can be performed in real-time, that is, over a processing time that is acceptable to the user, such as preferably a few minutes or less and more preferably a few seconds or less. Algebraic updating 30 is fast because it performs local updating without clustering (or re-clustering) documents. Application of the clustering builder 32 during a split operation is also typically fast because the number of documents in the pre-existing cluster that is being split is typically a small sub-set of the total number of documents 10 that are organized by the clustering system. For example, the application of the clustering builder 32 during a split operation has an execution time of typically a few seconds or less for pre-existing clusters including a tens, hundreds, or a few thousand documents. In contrast, applying the clustering builder 32 to perform a complete retraining of the cluster system involves clustering typically tens of thousand or more documents in the set of documents 10 and hence takes substantially longer. Such a complete retraining typically is not practical to perform in real-time.

Having described the overall clustering system including real-time updating with reference to FIG. 1 and with brief references to FIGS. 2-8, the processing for example association changes including document move, class move, and several types of merge and split operations is next described in greater detail with detailed reference to FIGS. 2-8 in turn. It is to be appreciated that these various operations can be combined in various ways to perform complex real-time updating of the clustering system. As just one example, a class can be moved to another part of the hierarchy, then split, and then one or more documents moved from one of the generated split classes to another of the generated split classes.

Figure 2:
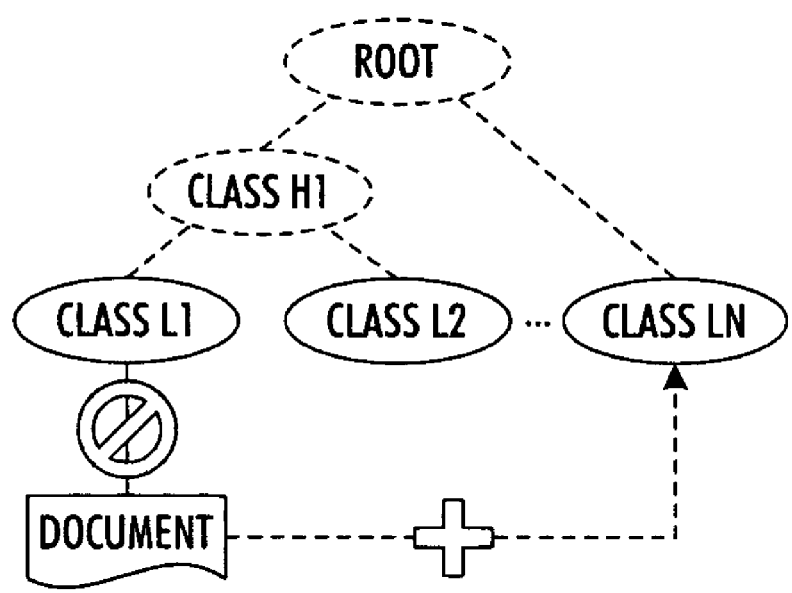
FIG. 2 diagrammatically shows an update in which a document is moved from a source class to a destination class.

With reference to FIG. 2, a document selected from the set of documents 10 organized by the clustering system is moved from a leaf class "L1" to a leaf class "LN". In such an operation, the hierarchy of classes may be flat (that is, including only leaf classes or only leaf classes off of a common root class), or it may be more complex, as indicated by the optional higher level class structure shown by short dashed lines in FIG. 2 and including a higher level class "H1" and a root class. The document move operation involves removal of the document from the leaf class "L1" (removal indicated by the "Ø" symbol in FIG. 2) and addition of the document to the leaf class "LN" (addition indicated by the dashed connector with the "+" symbol in FIG. 2). In order to account for the move of the document from source class "L1" to destination class "LN", a complete re-build of the hierarchy of classes 12 would be performed—however, such a complete rebuild is typically not feasible for real-time processing.

Accordingly, the algebraic probabilistic modeling parameters updater 30 of the processor 22 makes a local update of the probabilistic modeling parameters, which affects the source and destination leaf classes "L1" and "LN" as well as the intermediate class "H1" that is between the source leaf class "L1" and the common parent class "root" that is a common ancestor class for both the source leaf class "L1" and the destination leaf class "LN". More generally, the algebraic probabilistic modeling parameters updater 30 updates probabilistic modeling parameters characterizing the source and destination leaf classes as well as any intermediate ancestor class or classes disposed in the hierarchy between the source leaf class and the common parent class or disposed in the hierarchy between the destination leaf class and the common parent class. The term "common parent class" is to be understood as referring to the common parent class furthest down the hierarchy, that is, closest in the hierarchy to the source and destination leaf classes. The common parent class may itself have parent classes, which are also common to both the source and destination leaf classes.

The algebraic updating for the move operation is suitably performed as follows. Let the source leaf class be denoted by $C_s$ and the destination or target leaf class be denoted by $C_t$. Further let D denote the document to be moved, and let d denote any other document in the source class $C_s$ or in the target class $C_t$. The updating is suitably performed in four operations: removing the document D from the source class $C_s$ and updating the probabilistic modeling parameters for source class $C_s$; propagating the updating to any intermediate classes disposed in the hierarchy between source class $C_s$ and the common parent class of source and target classes $C_s$ and $C_t$; adding the document D to the destination or target cluster $C_t$ and updating the probabilistic modeling parameters for target class $C_t$; and propagating the updating to any intermediate classes disposed in the hierarchy between target class $C_t$ and the common parent class of source and target classes $C_s$ and $C_t$. Only probabilistic modeling parameters for the local classes, namely $C_s$, $C_t$, and any intermediate classes disposed between the source or target classes and the common parent class, are modified.

In FIG. 2, source class $C_s$ is the class "L1", target class $C_t$ is the class "LN", and there is one intermediate ancestor class "H1" between class "L1" and the common parent class (in the illustrated case, the root class) of classes "L1" and "LN". Other classes are not local, and hence are not updated. In FIG. 2, these non-local classes include leaf class "L2" and the "root" class. The move operation including algebraic updating of the probabilistic modeling parameters is as follows, where $|C_s|$ denotes the total word count of the source class $C_s$, $|C_t|$ denotes the total word count of the target class $C_t$, $|D|$ denotes the total word count of the document D, and N denotes the total word count for the collection of documents 10. Removal of the document D from the source class $C_s$ is accounted for by the following algebraic adjustments (where $P(\ )$ denotes the probabilistic modeling parameter before adjustment, and $\hat{P}(\ )$ denotes the probabilistic modeling parameter after adjustment by the algebraic probabilistic modeling parameters updater 30 to account for the moving of document D):

$$\hat{P}(D|C_s) = 0, \quad (3)$$

$$\hat{P}(d|C_s) = \frac{P(d|C_s)}{1 - |D|/|C_s|}, \forall d \in C_s \setminus \{D\}, \quad (4)$$

$$\hat{P}(C_s) = P(C_s) - |D|/N, \quad (5)$$

and $$\hat{P}(w|C_s) = \frac{P(w|C_s) - N_{wD}/|C_s|}{1 - |D|/|C_s|}, \forall w, \quad (6)$$

where in Equation (6) $N_{wD}$ is the word count of word w in document D. Equations (3)-(6) algebraically account for the effect of the removal of document D from the source class $C_s$. Additionally, if there are any intermediate ancestor classes disposed in the hierarchy between source class $C_s$ and the common parent class of source and target classes $C_s$ and $C_t$, the probabilistic modeling parameters characterizing these classes are algebraically adjusted as follows. Let $C^p$ denote the common parent class of source and target classes $C_s$ and $C_t$. Then the following iterative procedure is employed:

---

$C_s^p \leftarrow \text{parent}(C_s)$
while $C_s^p \neq C^p$ do {
    set $C_s^p$ probabilistic modeling parameters according to Equations
        (3)-(6), with $C_s$ replaced by $C_s^p$
    $C_s^p \leftarrow \text{parent}(C_s)$
}

---

Addition of the document D to the target class $C_t$ is accounted for as follows:

$$\hat{P}(D|C_t) = \frac{|D|}{|D| + |C_t|}, \quad (7)$$

$$\hat{P}(d|C_t) = \frac{P(d|C_t)}{1 - |D|/|C_t|}, \forall d \in C_t \setminus \{D\}, \quad (8)$$

$$\hat{P}(C_t) = P(C_t) + |D|/N, \quad (9)$$

and $$\hat{P}(w|C_t) = \frac{P(w|C_t) + N_{wD}/|C_t|}{1 + |D|/|C_t|}, \forall w. \quad (10)$$

Equations (7)-(10) algebraically account for the effect of the addition of document D to the destination or target class $C_t$. Additionally, if there are any intermediate ancestor classes disposed in the hierarchy between target class $C_t$ and the common parent class $C^p$ of source and target classes $C_s$ and $C_t$, the probabilistic modeling parameters characterizing these classes are algebraically adjusted as follows:

---

$C_t^p \leftarrow \text{parent}(C_t)$
while $C_t^p \neq C^p$ do {
    set $C_t^p$ probabilistic modeling parameters according to Equations
        (7)-(10), with $C_t$ replaced by $C_t^p$
    $C_t^p \leftarrow \text{parent}(C_t)$
}

Figure 3:
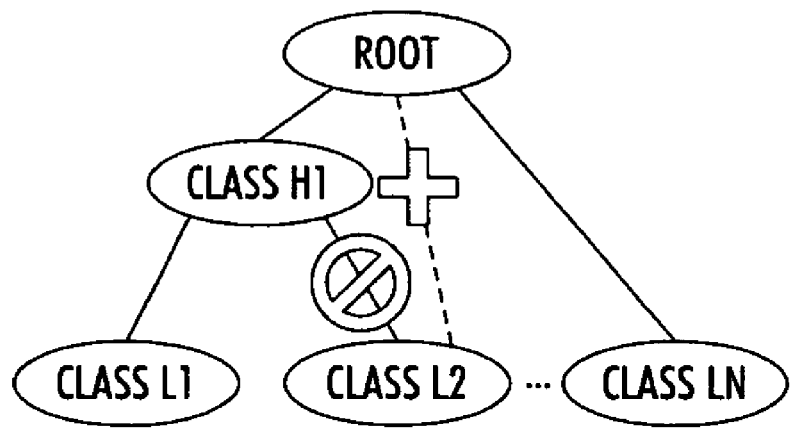
FIG. 3 diagrammatically shows an update in which a leaf class is moved from a source ancestor class to a destination ancestor class.

With reference to FIG. 3, a class move operation is next described. Leaf class "L2" is moved from class "H1" to the root class. The leaf class move involves removal of the leaf class "L2" from the source immediate ancestor class "H1" (removal indicated by the "Ø" symbol in FIG. 3) and addition of the leaf class "L2" to the destination or target immediate ancestor class "root" (addition indicated by the dashed connector with the "+" symbol in FIG. 3). In order to account for the move of the leaf class "L2" from source immediate ancestor class "H1" to destination immediate ancestor class "root", a complete re-build of the hierarchy of classes 12 would be performed—however, such a complete rebuild is typically not feasible for real-time processing.

Accordingly, the algebraic probabilistic modeling parameters updater 30 of the processor 22 makes a local update of the probabilistic modeling parameters. The local update affects the source and destination immediate ancestor classes as well as any intermediate ancestor class or classes disposed in the hierarchy between the immediate source ancestor class and the common parent class or disposed in the hierarchy between the immediate destination ancestor class and the common parent class. The algebraic updating is substantially analogous to the case for the document move operation. Removal of the leaf class, denoted C, from the source ancestor class, is reflected in the probabilistic modeling parameters characterizing the immediate ancestor class, denoted $C_s^p$, is as follows (where |C| denotes the total word count for the moved leaf class C):

$$\hat{P}(d \mid C_s^p) = 0, \forall d \in C, \quad (11)$$

$$\hat{P}(d \mid C_s^p) = \frac{P(d \mid C_s^p)}{1 - |C|/|C_s^p|}, \forall d \in C_s^p \setminus C, \quad (12)$$

and $$\hat{P}(w \mid C_s^p) = \frac{P(w \mid C_s^p) - P(w \mid C) \cdot |C|/|C_s^p|}{1 + |C|/|C_s^p|}, \forall w, \quad (13)$$

where P( ) denotes the probabilistic modeling parameter before adjustment, and $\hat{P}(\ )$ denotes the probabilistic modeling parameter after adjustment by the algebraic probabilistic modeling parameters updater 30 to account for the moving of the leaf cluster C. Additionally, if there are any intermediate ancestor classes disposed in the hierarchy between immediate source ancestor class $C_s^p$ and the common parent class $C^p$ of immediate source ancestor class $C_s^p$ and the immediate destination or target ancestor class, denoted $C_t^p$, the probabilistic modeling parameters characterizing these classes are algebraically adjusted as follows:

$C_s^p \leftarrow \text{parent}(C_s^p)$
while $C_s^p \neq C^p$ do {
    set $C_s^p$ parameters according to Equations (11)-(13)
    $C_s^p \leftarrow \text{parent}(C_s^p)$
}

Addition of the leaf class C to the immediate target ancestor class $C_t^p$ is accounted for as follows:

$$\hat{P}(d \mid C_t^p) = \frac{|d|}{|C| + |C_t^p|}, \forall d \in C, \quad (14)$$

where |d| denotes the total word count for document d, and $$\hat{P}(d \mid C_t^p) = \frac{P(d \mid C_t^p)}{1 + |C|/|C_t^p|}, \forall d \in C_t^p, \quad (15)$$

and $$\hat{P}(w \mid C_t^p) = \frac{P(w \mid C_t^p) + P(w \mid C) \cdot |C|/|C_t^p|}{1 + |C|/|C_t^p|}, \forall w. \quad (16)$$

Additionally, if there are any intermediate ancestor classes disposed in the hierarchy between immediate target ancestor class $C_t^p$ and the common parent class $C^p$ of immediate source ancestor class $C_s^p$ and the immediate target ancestor class $C_t^p$, the probabilistic modeling parameters characterizing these classes are algebraically adjusted as follows:

$C_t^p \leftarrow \text{parent}(C_s^p)$
while $C_t^p \neq C^p$ do {
    set $C_t^p$ parameters according to Equations (14)-(16)
    $C_t^p \leftarrow \text{parent}(C_t^p)$
}

Figure 4:
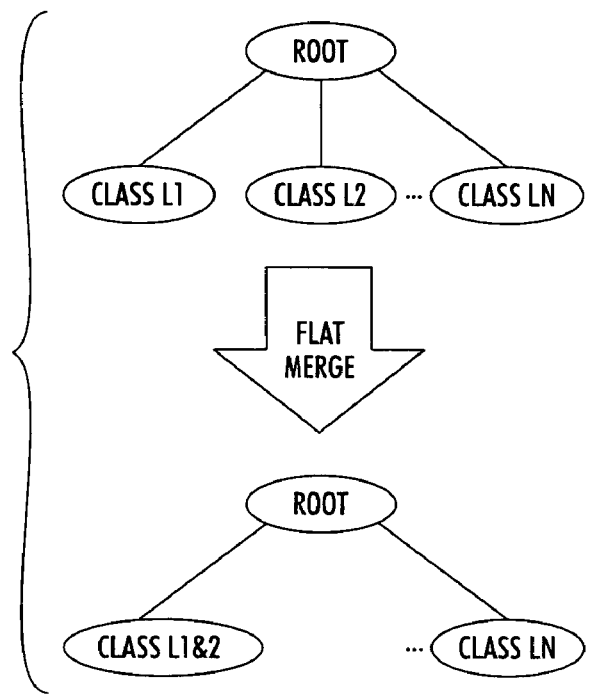
FIG. 4 diagrammatically shows an update in which two leaf classes having a common immediate ancestor class are merged.

With reference to FIG. 4, a flat merge operation is described. Leaf classes "L1" and "L2" having a common immediate ancestor class "root" are merged to form a merged leaf class "L1&2" that replaces the leaf classes "L1" and "L2". In other words, the association of documents of the leaf classes "L1" and "L2" are changed to the newly created merged class "L1&2", which replaces the classes "L1" and "L2" in the hierarchy of classes. The hierarchy of classes in FIG. 4 is a flat hierarchy; however, a more complex hierarchy can be used. For example, rather than being off the root class, the classes to be merged can have a common ancestor class that is intermediate between the root and the leaf classes to be merged. For such a merge operation to be meaningful, the common ancestor class should have at least one additional descendant leaf class that is not included in the merge operation.

The algebraic probabilistic modeling parameters updater 30 of the processor 22 accounts for a flat merge in the probabilistic modeling parameters as follows. Because the merged class replaces the classes to be merged in the hierarchy of classes, and because the classes to be merged have a common immediate ancestor class, the effect of the merge on the probabilistic modeling parameters is highly localized, and affects only the created merged class. The probabilistic modeling parameters of the merged class are suitably computed as follows, where L denotes the number of classes to be merged (L>1), $C_n$ denotes a leaf class to be merged (leaf class "L1" or "L2" in the example of FIG. 4), the index n runs over the two or more classes to be merged (in the following, a base-one index in which $n \in \{1, \ldots, L\}$ is used, but a base-zero index in which $n \in \{0, \ldots, L-1\}$, or other indexing arrangement could also be used), and C denotes the merged class (merged class "L1&2" in the example of FIG. 4):

$$P(C) = \sum_{n=1}^{L} P(C_n), \qquad (17)$$

$$P(w|C) = \frac{\sum_{n=1}^{L} P(w|C_n) \cdot P(C_n)}{P(C)}, \qquad (18)$$

and $$P(d|C) = \frac{\sum_{n=1}^{L} P(d|C_n) \cdot P(C_n)}{P(C)} = \frac{|d|}{|C|}, \qquad (19)$$

where $|d|$ and $|C|$ are the total word counts for document d and merged class C, respectively. The original leaf classes $C_n$ are removed from the hierarchy of classes and replaced by the merged class C, with all documents previously associated with the leaf classes $C_n$ now associated with the merged class C.

Figure 5:
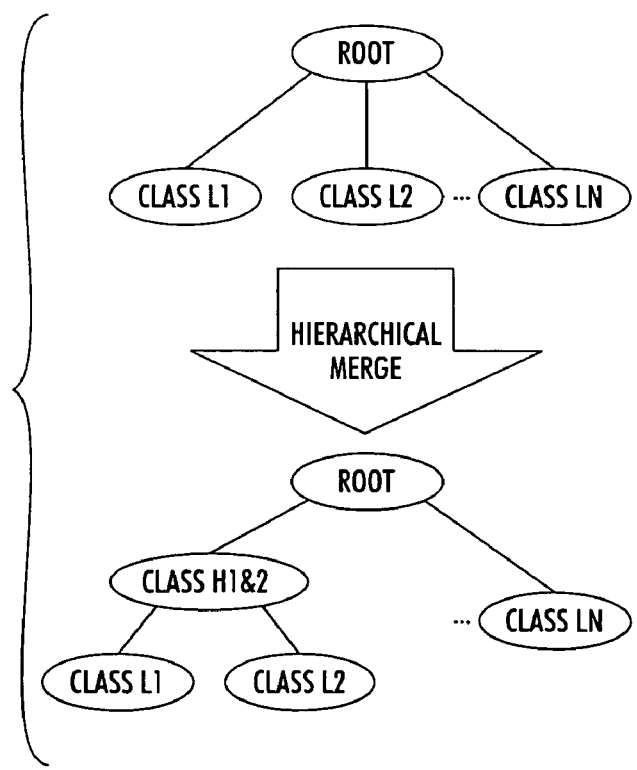
FIG. 5 diagrammatically shows an update in which two leaf classes having a common immediate ancestor class are merged by creating a common immediate ancestor class.

With reference to FIG. 5, a hierarchal merge is described. Leaf classes "L1" and "L2" having a common immediate ancestor class "root" are merged by inserting a merged leaf class "H1&2" between the leaf classes "L1" and "L2" and the immediate ancestor class "root". The inserted merged leaf class "H1&2" is therefore indicative of the combination or merger of leaf classes "L1" and "L2", but, unlike in the flat merge, here the original leaf classes "L1" and "L2" are retained. The effect of the hierarchal merge on the probabilistic modeling parameters is again highly localized, and affects only the inserted merged class and the position in the hierarchy of the leaf classes to be merged. The probabilistic modeling parameters of the merged class are suitably computed as follows, where L denotes the number of classes to be merged (L>1), $C_n$ denotes a class to be merged (classes "L1" and "L2" in the example of FIG. 4), the index n runs over the two or more classes to be merged (again using the conventional base-one index in which n∈{1, . . . , L}), and C denotes the merged class (inserted merged class "L1&2" in the example of FIG. 4):

$$P(C) = 0 \qquad (20)$$

(indicating that the inserted merged class C is a non-leaf class that itself contains no documents), $$P(w|C) = \frac{\sum_{n=1}^{L} P(w|C_n) \cdot P(C_n)}{\sum_{n=1}^{L} P(C_n)} = \frac{N_{wC}}{|C|}, \qquad (21)$$

and $$P(d|C) = \frac{\sum_{n=1}^{L} P(d|C_n) \cdot P(C_n)}{\sum_{n=1}^{L} P(C_n)} = \frac{|d|}{|C|}, \qquad (22)$$

where $|d|$ and $|C|$ are the total word counts for document d and merged class C, respectively, and $N_{wC}$ is the total count of occurrences of word w in the merged class C. The original leaf classes $C_n$ (leaf classes "L1" and "L2" in the example of FIG. 5) are retained in the case of a hierarchal merge, and the newly created merged class C (class "H1&2" in the example of FIG. 5) is inserted in the hierarchy of classes between the original leaf classes $C_n$ and the immediate common ancestor class of the original leaf classes $C_n$. All documents remain associated with their respective leaf classes $C_n$, but now also indirectly depend from the inserted merged class C.

Figure 6:
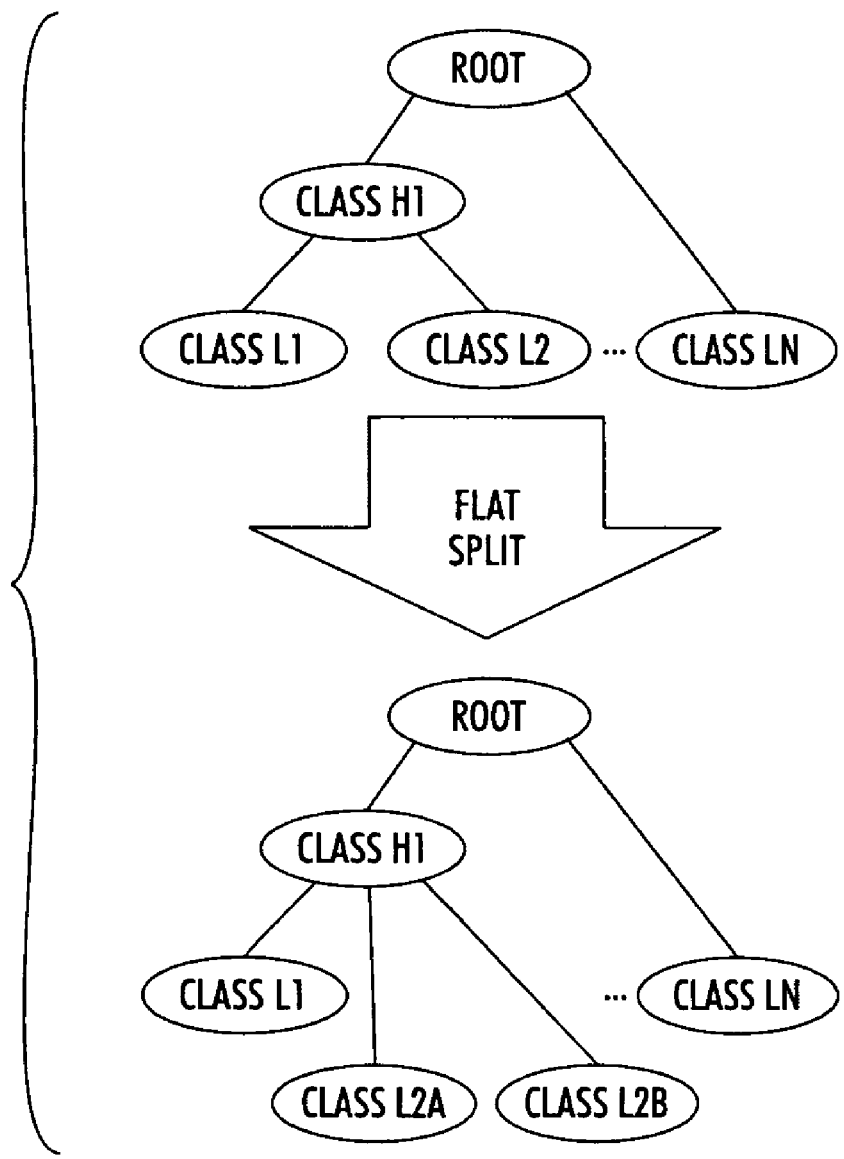
FIG. 6 diagrammatically shows an update in which a pre-existing leaf class is split into two split leaf classes that replace the pre-existing leaf class.

With reference to FIG. 6, a flat split operation is described. A pre-existing leaf class "L2" is split into two or more split leaf classes, in FIG. 6 two split leaf classes "L2A and L2B", that replace the pre-existing leaf class in the hierarchy of classes. Before the split the pre-existing leaf class "L2" has class "H1" as its immediate ancestor class, and after the split the replacement split leaf classes "L2A and L2B" have their common immediate ancestor class "H1". While in the example of FIG. 6 the common immediate ancestor class "H1" is an intermediate class, in other embodiments the hierarchy of classes may be flat, and the immediate ancestor class for the pre-existing leaf class and the replacement split leaf classes may be the root class.

To divide documents associated with the pre-existing leaf class amongst the two or more replacement split leaf classes, cluster training is performed. However, in order to promote rapid processing conducive to real-time operations, the clustering builder 32 of the processor 22 is limited to processing documents associated with the pre-existing leaf class (example pre-existing leaf class "L2" in FIG. 6). The limited cluster training generates local probabilistic model parameters for characterizing the split leaf classes (example split leaf classes "L2A" and "L2B" in FIG. 6) respective to the documents associated with the pre-existing leaf class. Because the number of documents associated with the single pre-existing class to be split is typically substantially smaller than the total number of documents organized by the clustering system, this limited and local cluster training can be performed substantially faster than a retraining of the clustering system as a whole. Additionally, since the limited cluster training is local to documents of the pre-existing leaf class, its effect is localized.

Suitable processing for performing the flat split is as follows. The pre-existing class is denoted by C, while the set of documents $D_C$ denotes those documents associated with the pre-existing leaf class C. For hard partitioning, P(d|C)=0 for all documents that are not members of $D_C$. The clustering builder 32 is applied to the set of documents $D_C$ with L denoting the number of split leaf classes. The index n runs over the split leaf classes, and $C_n$ denotes the split leaf classes. The local cluster training produces a set of local probabilistic modeling parameters for the split leaf classes $C_n$, such as $\hat{P}(C_n), \hat{P}(d|C_n), \hat{P}(w|C_n)$, or so forth. These local probabilistic modeling parameters are computed for the set of documents $D_C$ without accounting for other documents of the clustering system. Thus, for example:

$$\sum_{n=1}^{L} \hat{P}(C_n) = 1, \qquad (23)$$

indicating that every document in the set of documents $D_C$ is associated with one of the split leaf classes. $C_n$. On the other hand, in the context of the global clustering system:

$$\sum_{n=1}^{L} P(C_n) = P(C), \quad (24)$$

since the set of documents $D_C$ is the set of documents associated with the pre-existing leaf class C in the global clustering system. To convert the local probabilistic modeling parameters $\hat{P}(C_n)$, $\hat{P}(d|C_n)$, $\hat{P}(w|C_n)$ into corresponding probabilistic modeling parameters $P(C_n)$, $P(d|C_n)$, and $P(w|C_n)$ suitable for use in the context of the clustering system as a whole, the algebraic probabilistic modeling parameters updater 30 is applied as follows:

$$P(C_n) = \hat{P}(C_n) \cdot P(C) \quad (25),$$

$$P(d|C_n) = \hat{P}(d|C_n) \quad (26),$$

$$P(w|C_n) = \hat{P}(w|C_n) \quad (27).$$

Equations (26) and (27) are identity equations, as the values for these probabilistic modeling parameters are the same in the local context as in the global clustering system context. With the global probabilistic modeling parameters determined, the flat split is completed by replacing the pre-existing leaf class (leaf class "L2" in example FIG. 6) with the split leaf classes (leaf classes "L2A" and "L2B" in example FIG. 6) with the documents of the pre-existing leaf class being associated with the various split leaf classes in accordance with the results of the local cluster training.

It will be noted that the flat merge is the reverse operation to the flat split in some sense. Splitting a pre-existing leaf class and then merging the resulting split leaf classes will result in obtaining identically the original pre-existing leaf class. The reverse is not true—merging several leaf classes and then splitting the merged class may produce different leaf classes. That is, for example, merging five leaf classes and then splitting the merged leaf class back into five leaf classes will in general not result in identically the same original five leaf classes.

Figure 7:
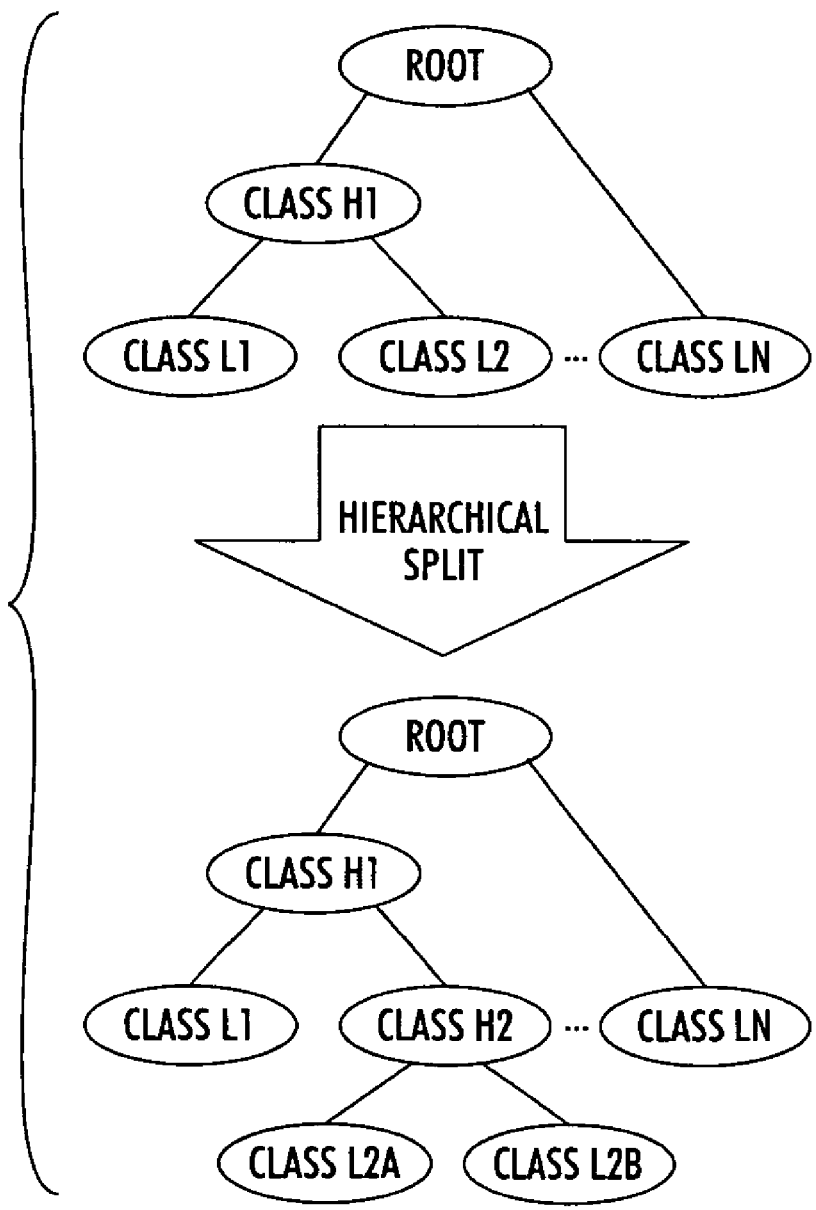
FIG. 7 diagrammatically shows an update in which a pre-existing leaf class is split into two split leaf classes by emptying the documents of the pre-existing leaf class into two new split leaf classes having the pre-existing leaf class as a common immediate ancestor class.

With reference to FIG. 7, a hierarchal split is described. In this case, the pre-existing leaf class is not replaced—rather, the split leaf classes $C_n$ are added and placed off of the pre-existing leaf class C, and the document contents $D_C$ of the pre-existing leaf class are emptied into the added split leaf classes. FIG. 7 depicts an example, in which document contents of the pre-existing leaf class "L2" are emptied into added split leaf classes "L2A" and "L2B". After the hierarchal split, the pre-existing leaf class is no longer a leaf class, but rather is the immediate ancestor class of the split leaf classes. Accordingly, after the hierarchal split, the pre-existing class itself contains no documents. The division of the set of documents $D_C$ amongst the added split leaf classes $C_n$ are suitably determined using the clustering builder 32 of the processor 22, as in the flat split, and the clustering produces local probabilistic modeling parameters such as $\hat{P}(C_n)$, $\hat{P}(d|C_n)$, and $\hat{P}(w|C_n)$. To convert the local probabilistic modeling parameters $\hat{P}(C_n)$, $\hat{P}(d|C_n)$, $\hat{P}(w|C_n)$ into corresponding probabilistic modeling parameters $P(C_n)$, $P(d|C_n)$, and $P(w|C_n)$ suitable for use in the context of the clustering system as a whole, the algebraic probabilistic modeling parameters updater 30 is again applied in accordance with Equations (25)-(27). Additionally, for the pre-existing class C which is retained in the case of hierarchal clustering:

$$P(C) = 0 \quad (28),$$

and $P(w|C)$ and $P(d|C)$ are unchanged. The pre-existing class C is retained and serves as the immediate ancestor class for the added split leaf clusters, and the documents that were associated with the pre-existing class C are associated with the various added split leaf clusters in accordance with the local cluster training.

In the case of a flat split followed by a flat merge of the split leaf classes, the original leaf class is obtained. In contrast, the hierarchical merge is not an inverse operation to the hierarchical split. This is because both the hierarchical merge and the hierarchical split create additional hierarchy.

In the foregoing example flat and hierarchical split operations, it was assumed that the user has no preference as to how the split is performed. In other words, the user relies entirely upon the mechanics of the clustering builder 32 which decides which documents are grouped into which split leaf classes. In some cases, however, the user may want to keep a certain sub-set of documents together during the split operation. This is suitably referred to as a constrained split. Accordingly, a technique is described for performing a split (either flat or hierarchal) in a clustering system in which documents are represented in a bag-of-words format, in which the document is represented by a word-frequency vector or other format that stores counts of keywords or of words other than certain frequent and typically semantically uninteresting stop words (such as "the", "an", "and", or so forth). The described technique for keeping a selected sub-set of documents together during the split can be applied in the context of substantially any split operation that employs a clustering technique operating on documents in a bag-of-words format to distribute documents amongst the split classes. The technique is not limited to probabilistic clustering systems. The example notation used herein is as follows: C denotes the class to be split; L denotes the number of split classes to be generated by the split (the split leaf clusters may replace the class C in the case of a flat split, or may be appended to the class C in the case of a hierarchal split); and $G = \{d_1, \ldots d_n\}$ denotes a sub-set of n documents to be grouped together, where $n > 1$.

Prior to performing the split, the sub-set of documents G is replaced by a single temporary document $g = d_1 * d_2 * \ldots * d_n$ where the operator "*" denotes additive combination of the word counts of the bag-of-words-formatted documents. Table 1 shows an illustrative example of generation of the temporary document $g = d_1 * d_2 * d_3$ for the case of a sub-set of three documents $G = \{d_1, d_2, d_3\}$ with the bag-of-words representation indicated in Table 1. For example, Table 1 shows that for the word "computer", document $d_1$ has a word count of 53, document $d_2$ has a word count of 420, and document $d_3$ has a word count of 232. Accordingly, the temporary document $g = d_1 * d_2 * d_3$ has a word count for the word "computer" of 53+420+232=705. The same approach is used for each word of the bag-of-words, such as for "hard drive", "RAM", and so forth. The document $d_1$ has a total word count (optionally excluding selected stopwords) of 2245 words; document $d_2$ has a total word count of 11,025 words; and document $d_3$ has a total word count of 6346 words. Accordingly, the temporary document $g = d_1 * d_2 * d_3$ has a total word count of 2245+11,025+6346=19,616 words. Note that the term "floppy" does not occur in document $d_3$. In such a case, where for example "floppy" is not in the bag-of-words representing document $d_3$, the count for term "floppy" is taken as zero for document $d_3$. More generally, the temporary document g includes all words that are present in any of the bag-of-words representations of any of the documents of the sub-set of documents G.

TABLE 1

Example of generating temporary document g for G = {d₁, d₂, d₃}

| Word | d₁ word count | d₂ word count | d₃ word count | g word count |
|---|---|---|---|---|
| "computer" | 53 | 420 | 232 | 705 |
| "hard drive" | 23 | 321 | 111 | 455 |
| "RAM" | 10 | 43 | 120 | 173 |
| "floppy" | 32 | 23 | — | 55 |
| ... | ... | ... | ... | ... |
| Total | 2245 | 11025 | 6346 | 19616 |

The temporary document g is substituted for the sub-set of documents G in the pre-existing class to be split. After this substitution, the clustering algorithm is performed on the documents of the class C with the number of split classes set to L. As the temporary document g is a single document, it will be clustered as a unit. In the case of hard partitioning, the temporary document g will be associated with a single one of the split classes by the clustering. The clustering can use probabilistic clustering or substantially any other clustering algorithm, including a non-probabilistic clustering technique such as k-means, latent semantic indexing or hierarchical agglomerative methods. For probabilistic clustering, a maximum likelihood probabilistic clustering algorithm may be employed, such as an expectancy maximization (EM) algorithm, a gradient descent algorithm, or so forth. Once the clustering is complete, the temporary document g is replaced by the sub-set of documents G={d₁, . . . d_n}, with each document d₁, . . . , d_n being associated with the same split class with which the clustering associated the temporary document g. For example, if L=7 and the clustering associated the temporary document g with a particular split class $C_k$ of the seven split classes, then every document d₁, . . . , d_n is associated with the same split class $C_k$. If probabilistic clustering is employed, then the document probabilities $P(d|C_k)$ for the documents d₁, . . . , d_n of the sub-set G, and for split class k with which the temporary document g is associated, are computed based on the document probability $\hat{P}(g|C_k)$ generated by the clustering, as follows:

$$P(d_i | C_k) = \frac{|d_i|}{\sum_{d_j \in G} |d_j|} \cdot \hat{P}(g | C_k), \forall d_i \in G, \quad (29)$$

where $|d_i|$ denotes the total word count for document $d_i$ and $|d_j|$ denotes the total word count for document $d_j$. Probabilities $P(C_k)$ and $P(w|C_k)$ are unchanged by the substitution of the documents d₁, . . . , d_n for the temporary document g in the class $C_k$.

If the user identifies more than one sub-set of documents, each of which is to be kept together, the above approach can continue to be used. For example, if the user identifies N sub-sets of documents, with each sub-set of documents denoted as $G^{(p)}=\{d_1^{(p)}, d_2^{(p)}, \ldots, d_n^{(p)}\}$ where the index p runs over the N sub-sets of documents and each sub-set $G^{(p)}$ has no intersection with (that is, no documents in common with) any other user-identified sub-set of documents, then for each sub-set of documents $G^{(p)}$ a corresponding temporary document $g^{(p)}=d_1^{(p)}*d_2^{(p)}* \ldots *d_n^{(p)}$ is created to replace the set of documents $G^{(p)}$ in the class to be split. The clustering is then performed as before, so that each temporary document $g^{(p)}$ is assigned to a split class, and each temporary document $g^{(p)}$ is expanded as before, including application of Equation (29) in the case of probabilistic clustering.

In some cases, not only will the user identify more than one sub-set G of documents, each of which is to be kept together, but the user will also indicate that each sub-set of documents $G^{(p)}$ is to be associated with a different split class. This is suitably termed an "exclusive group constraint" or a "disjunction constraint", and is readily accomplished by manipulating the clustering to ensure that each corresponding temporary document $g^{(p)}$ is assigned to a different class during the clustering process. For example, in the case of probabilistic clustering employing the expectation maximization (EM) algorithm, the following approach is suitable. The EM clustering algorithm is initialized with special values for the document probability (that is, P(d|c)) parameters to force the disjunction between the groups. This initialization implements a simple and reasonable assumption: user-specified exclusive constraints are transitive. That is, if the user specifies that classes $G^{(1)}$ and $G^{(2)}$ are disjoint and that classes $G^{(2)}$ and $G^{(3)}$ are disjoint, then it is assumed that $G^{(1)}$ and $G^{(3)}$ are also disjoint. In other words, it is assumed that every sub-set of documents $G^{(p)}$ is to be disjoint from (that is, assigned to a different class from) every other sub-set of documents. The initialization implements a default assignment of the temporary documents $g^{(p)}$ to the split classes, denoted $C_k$, which ensures that the sub-sets $G^{(p)}$ will be disjoint in the resulting split structure. In a suitable approach using EM clustering, the initialization suitably assigns $P(c_k|g^{(p)})=1$ for k=p and $P(c_k|g^{(p)})=0$ for k≠p, and assigns $P(c_k|d_i)=1/L$ for $d_i \notin G^{(1)}, \ldots, G^{(n)}$ (that is, the documents not in any of the sub-sets $G^{(p)}$ are initially assigned a uniform distribution amongst the split classes $c_k$). The probability $P(d)=|d|/|C|$ is initially assigned for any document d that is in the class to be split, denoted C. Finally, the initial word probabilities are assigned as follows:

$$P(w | c_k) = \frac{N_{wC}}{|C|} + \varepsilon, \quad (30)$$

where $N_{wC}$ is the number of occurrences of word w in the class C to be split, and $\varepsilon$ is a small perturbation. The EM clustering is then performed. The EM clustering iterative process ensures that after the above initialization, each next iteration will keep the same binary values for $P(c_k|g^{(p)})$. The initial state respects the disjunctions between the sub-sets of documents $G^{(p)}$ represented by temporary documents $g^{(p)}$. Accordingly, after several iterations of the EM algorithm a locally optimal clustering of the documents is reached, initially contained in cluster C that respects the exclusive constraints. After the EM clustering, for each split class $c_k$, any temporary document $g^{(p)}$ associated therewith is expanded back to the constituent documents $G^{(p)}=\{d_1^{(p)}, d_2^{(p)}, \ldots, d_n^{(p)}\}$ including application of Equation (29).

With returning reference to FIG. 1, the document move, leaf class move, leaf classes merge, and leaf class split operations described herein are suitably implemented in real-time in conjunction with user inputs supplied via the user interface 20. By the term "real-time", it is meant that the operation can be performed in a time-frame that is acceptable to a user interacting with the user interface 20. Typically, such a time-frame is preferably a few minutes or less, and more preferably a few seconds or less. In some embodiments, the user interface 20 is a graphical user interface (GUI) in which the hierarchy of classes 12 is suitably represented in a tree or tree-like structure, optionally including expandable and collapsible branches, in which the user can select classes, documents, and so forth using a mouse or other pointing device.

For example, in one approach the user performs a move operation on a document or leaf class by right-clicking on the document or leaf class to bring up a context-sensitive menu including a selection for the move operation. The user selects the move operation off of the context-sensitive menu, which then brings up a dialog asking for the destination class. The user selects the destination class, for example by clicking on it using the mouse point, the document or leaf class move is performed as described herein, and an updated tree representation of the hierarchy of classes 12 is displayed. The GUI preferably includes suitable checks on the operation, such as displaying the move operation selection option in the context-sensitive menu only if the user right-clicks on a document or leaf class. In some embodiments, the user can select several documents or leaf classes to move by, for example, holding down the <CONTROL> or <ALT> key while left-clicking on the documents, and then right-clicking on the selected group to bring up the context-sensitive menu including the move operation selection option.

To execute a merge operation, the user suitably selects multiple leaf classes for merging by, for example, holding down the <CONTROL> or <ALT> key while left-clicking on the documents, and then right-clicking on the selected group to bring up the context-sensitive menu. If the GUI determines that the selections are all leaf classes having a common immediate ancestor class (which may be the root class), then the GUI includes a merge option in the context-sensitive menu. If the user selects the merge option, then the GUI responds by asking whether a flat or hierarchal merge is intended. (Alternatively, separate "flat merge" and "hierarchal merge" options can be included on the context-sensitive menu). The selected leaf classes are then merged using the selected flat or hierarchal merge as described herein, and an updated tree representation of the hierarchy of classes 12 is displayed.

To execute a split operation, the user selects a leaf class to be split, and right-clicks to bring up the context-sensitive menu. If the GUI determines that the selection is a leaf class, then it includes the split option on the context sensitive menu. If the user selects the split option off the context-sensitive menu, then the GUI responds by asking whether a flat or hierarchal split is intended. (Alternatively, separate "flat split" and "hierarchal split" options can be included on the context-sensitive menu). Additionally, the GUI asks for a value indicating the number of split classes to create. Preferably, the GUI includes a check to ensure that the number of split classes supplied by the user is greater than one and is less than a total number of documents in the class to be split. The selected leaf class is then split using the selected flat or hierarchal split as described herein, and an updated tree representation of the hierarchy of classes 12 is displayed.

To implement a constrained split in which one or more sub-sets of documents $G^{(p)}$ are kept together, the user opens the leaf class, for example by double-clicking, and selects a sub-set by holding the <CONTROL>, <ALT>, or other grouping key down while clicking on the documents that are to be included in the sub-set of documents. This process is optionally repeatable to define more than one sub-set of documents to be kept together. The user then selects the split option as before, and the GUI recalls the selected groups and keeps them together using substituted temporary documents as described herein. Optionally, before performing the split the GUI asks the user whether the groups are to be clustered into separate split leaf classes (that is, whether the clustering should employ an "exclusive group constraint" in the clustering), and performs the constrained split in accordance with the user's response.

The described GUI operations are illustrative examples which use mouse manipulations familiar to users of typical GUI systems such as Microsoft Windows® computer operating systems. Other GUI implementations can be employed to facilitate execution of real-time document move, leaf class move, classes merge and class split operations as described herein. Moreover, it is contemplated to implement these operations, either in real-time or as processes queued for later processing, using non-graphical interfacing such as a batch processing script, command-line user interface, or so forth.

Heretofore, the class move, split, and merge operations have been described respective to moving, splitting, or merging a leaf cluster. However, these operations can be extended to moving, splitting, or merging larger branches of the hierarchy of classes.

For example, when a non-leaf class is moved along with all descendant classes, the algebraic updating is suitably as follows. The non-leaf class that is moved is denoted c, and its immediate ancestor class (that is, the source ancestor class) is denoted $C_s^p$. The symbol $|C_s^p|$ denotes the number of word occurrences in the source ancestor class $C_s^p$ before non-leaf class c is moved, and $|c|$ denotes the number of word occurrences in all leaf classes that depend from non-leaf class c. The immediate destination or target ancestor class to which class c is moved is similarly denoted $C_t^p$, and $|C_t^p|$ denotes the number of word occurrences in the target ancestor class $C_t^p$ before non-leaf class c is moved. The probabilistic modeling parameters of the source ancestor class $C_s^p$ are suitably updated in a manner analogous to that of Equations (11)-(13) as follows:

$$\hat{P}(d \mid C_s^p) = 0, \forall d \in C, C \downarrow c, \tag{31}$$

$$\hat{P}(d \mid C_s^p) = \frac{P(d \mid C_s^p)}{1 - |c|/|C_s^p|}, \forall d \in C_s^p \setminus C, \tag{32}$$

and $$\hat{P}(w \mid C_s^p) = \frac{P(w \mid C_s^p) - P(w \mid c) \cdot |c|/|C_s^p|}{1 - |c|/|C_s^p|}, \forall w, \tag{33}$$

The changes are propagated to any intermediate ancestor classes between source ancestor class $C_s^p$ and the common parent class $C^p$ in the same way as in the case of a leaf class move operation. The effect on the probabilistic modeling parameters characterizing $C_t^p$ of moving the non-leaf class c onto the immediate target ancestor class $C_t^p$ is accounted for analogously to Equations (14)-(16):

$$\hat{P}(d \mid C_t^p) = \frac{|d|}{|c| + |C_t^p|}, \forall d \in C, C \downarrow c, \tag{34}$$

where $|d|$ denotes the total word count for document d, and $$\hat{P}(d \mid C_t^p) = \frac{P(d \mid C_t^p)}{1 + |c|/|C_t^p|}, \forall d \in C_t^p, \tag{35}$$

and $$\hat{P}(w \mid C_t^p) = \frac{P(w \mid C_t^p) + P(w \mid c) \cdot |c|/|C_t^p|}{1 + |c|/|C_t^p|}, \forall w. \tag{36}$$

The changes are again propagated to any intermediate ancestor classes between target ancestor class $C_t^p$ and the common parent class $C^p$ in the same way as in the case of a leaf class move operation.

In similar fashion, a flat merge into a single non-leaf class c of non-leaf classes $c_n$ having a common immediate parent class, where index n runs from 1 to L, is performed as follows. The number of words in documents associated with the leaf classes descending from non-leaf class $c_n$ is denoted $|c_n|$, and the number of words in documents associated with leaf classes descending from merged non-leaf class c is denoted, $|c|$. Thus, $$|c| = \sum_{n=1}^{L} |c_n|. \qquad (37)$$

The algebraic probabilistic model parameters updater 30 computes the parameters for the merged class c in a manner analogous to Equations (17)-(19) as follows:

$$P(c) = \sum_{n=1}^{L} P(c_n) = 0, \qquad (38)$$

where equality with zero results because a non-leaf class itself contains no documents, hence $P(c_n)=0$. The word probabilities for merged class c are:

$$P(w|c) = \frac{\sum_{n=1}^{L} P(w|c_n) \cdot |c_n|}{\sum_{n=1}^{L} |c_n|}, \qquad (39)$$

and the document probabilities are:

$$P(d|c) = \frac{\sum_{n=1}^{L} P(d|c_n) \cdot |c_n|}{\sum_{n=1}^{L} |c_n|} = \frac{|d|}{|c|}, \qquad (40)$$

where $|d|$ is the number of words in document d. To complete the merge, the non-leaf classes $c_n$ are replaced by the merged class c which descends from the common parent of the classes $c_n$ and which contains the descendent classes that descended from the non-leaf classes $c_n$ prior to the flat merge.

A hierarchical merge of leaf classes has been described with reference to FIG. 5 and Equations (20)-(22). More generally, any set of classes, either leaf classes or non-leaf classes, having the same immediate ancestor (i.e., parent) class $C^p$ can be merged.

Figure 8:
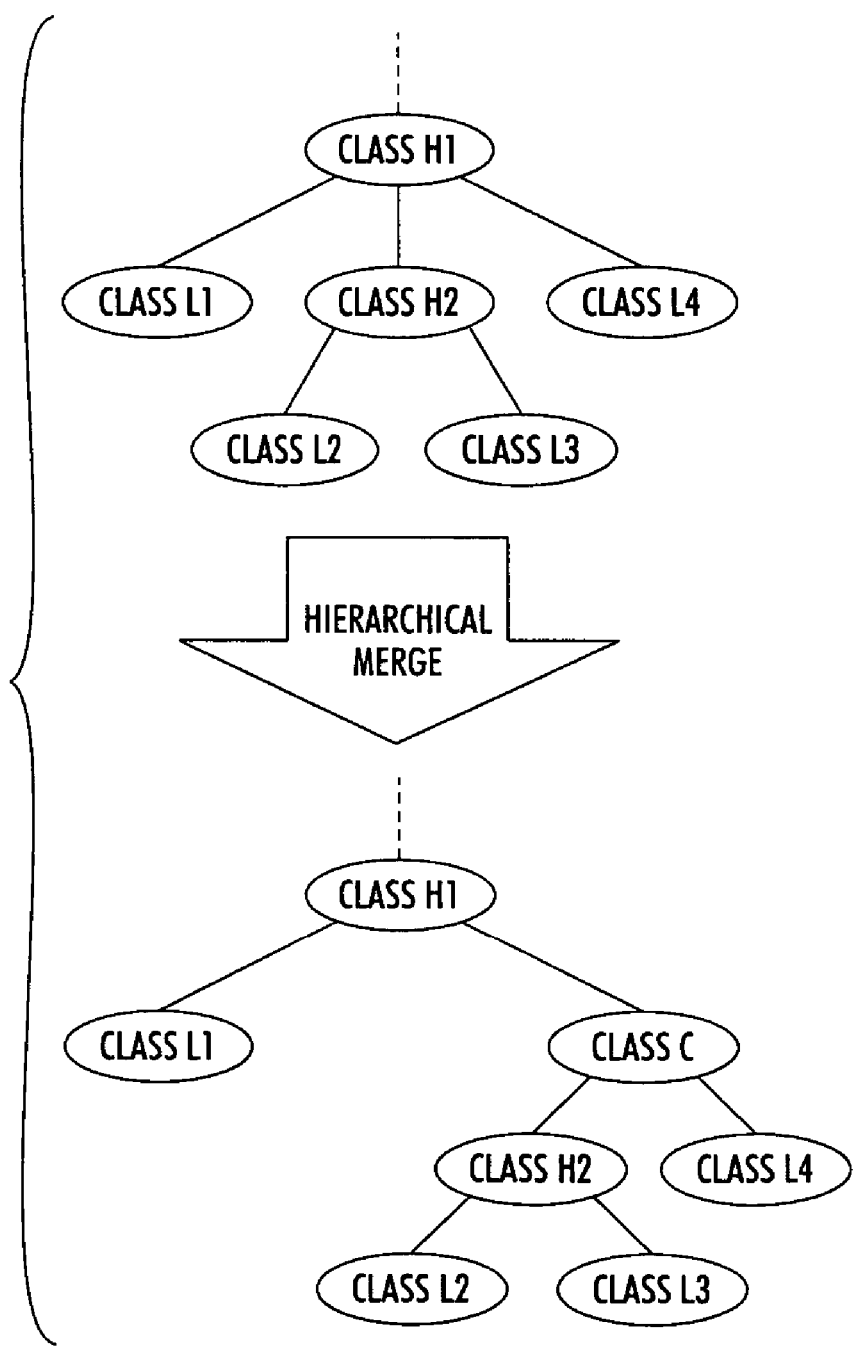
FIG. 8 diagrammatically shows an update in which a non-leaf class and a leaf class having a common immediate ancestor class are merged by creating a common immediate ancestor class.

With reference to FIG. 8, for example, a non-leaf class "H2" having immediate ancestor class. "H1" and having descendant leaf classes "L2" and "L3" is hierarchically merged with a leaf class "L4" also having the immediate ancestor class "H1". The hierarchical merge is performed by inserting a new merged non-leaf class "c" between the immediate ancestor class "H1" and the merged classes "H2" and "L4" as shown in FIG. 8.

The algebraic probabilistic model parameters updater 30 computes the parameters for the merged class c in a manner analogous to Equations (20)-(22) as follows. Let $c_n$ represent the classes (leaf or non-leaf) to be merged, with index n running from 1 to L. The common immediate ancestor class to the classes $c_n$ is denoted $C^p$. The notation $|c_n|$ denotes the number of words in documents associated with class $c_n$ if class $c_n$ is a leaf class, or denotes the number of words in documents associated with leaf classes descending from the class $c_n$ if class $c_n$ is a non-leaf class. The latter is suitably expressed as:

$$|c_n| = \sum_{C \downarrow c_n} |C|. \qquad (41)$$

Then the number of words $|c|$ in the inserted merged class c is given by:

$$|c| = \sum_{n=1}^{L} |c_n|. \qquad (42)$$

The algebraic probabilistic model parameters updater 30 computes the parameters for the inserted merged class c in a manner analogous to Equations (20)-(22) as follows:

$$P(c)=0 \qquad (43)$$

(indicating that the inserted merged class c is a non-leaf class that itself contains no documents), $$P(w|c) = \frac{\sum_{n=1}^{L} P(w|c_n) \cdot |c_n|}{\sum_{n=1}^{L} |c_n|} = \frac{N_{wc}}{|c|}, \text{ and} \qquad (44)$$

$$P(d|c) = \frac{\sum_{n=1}^{L} P(d|c_n) \cdot |c_n|}{\sum_{n=1}^{L} |c_n|} = \frac{|d|}{|c|}, \qquad (45)$$

where $N_{wc}$ is the total count of occurrences of word w in documents associated with leaf classes descending from the merged class c. To complete the merge, the class c is inserted in the hierarchical structure under the common parent $C^p$, and the merged classes $c_n$ are arranged to descend from inserted class c.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for updating a probabilistic clustering system defined at least in part by probabilistic model parameters indicative of word counts, ratios, or frequencies characterizing classes of the clustering system, wherein the probabilistic clustering system includes a hierarchy of classes with documents assigned to leaf classes of the hierarchy, the method comprising:

changing an association of one or more documents from one or more source classes to one or more destination classes; and locally updating probabilistic model parameters characterizing classes affected by the changed association without updating probabilistic model parameters characterizing classes not affected by the changed association;

wherein the changing of the association comprises creating two or more split leaf classes and performing clustering training to associate each document of a pre-existing leaf class with one of the two or more split leaf classes, the cluster training being limited to documents associated with the pre-existing leaf class, the cluster training generating local probabilistic model parameters for characterizing the split leaf classes respective to the documents associated with the pre-existing leaf class, and the changing of the association further comprises one of:

(i) replacing the pre-existing leaf class with the two or more split leaf classes in the hierarchy of classes, said documents being associated with the two or more split leaf classes by the cluster training, and (ii) associating each split leaf class with the pre-existing leaf class such that the pre-existing leaf class is the immediate ancestor of each split leaf class, and removing all documents from the pre-existing leaf class, said documents being associated with the two or more split leaf classes by the cluster training; and wherein the local updating operation is performed by a processor configured to perform the local updating.

2. The method as set forth in claim 1, wherein the local updating comprises:

algebraically combining the local probabilistic model parameters of each split leaf class and the probabilistic parameters of the pre-existing leaf class to produce probabilistic model parameters characterizing the two or more split leaf classes respective to the documents of the probabilistic clustering system.

3. The method as set forth in claim 1, wherein the changing of the association further comprises:

(i) defining a plurality of documents as a document group that is to be kept together, each document of the document group being represented as a bag-of-words and being associated with the pre-existing leaf class;

(ii) prior to the performing of cluster training, replacing the plurality of documents of the document group with a temporary document having a bag-of-words representation that combines word counts of the documents of the document group such that the subsequent cluster training associates the temporary document with one of the split leaf classes;

(iii) after the performing of the cluster training, replacing the temporary document with the plurality of documents of the document group, each of the plurality of documents being associated with the same split leaf class with which the temporary document was associated by the cluster training.

4. The method as set forth in claim 3, wherein the operations (i), (ii), and (iii) are repeated for two or more document groups, and the performing of cluster training further comprises:

associating the temporary document replacing each document group with a different split leaf class.

5. In a clustering system including a hierarchy of classes with documents assigned to leaf classes of the hierarchy, in which each document is represented as a bag-of-words, a method for splitting a pre-existing class into two or more split leaf classes, the method comprising:

(i) defining a plurality of documents associated with the pre-existing class as a document group that is to be kept together;

(ii) replacing the plurality of documents of the document group with a temporary document having a bag-of-words representation that combines word counts of the documents of the document group;

(iii) performing clustering to associate each document of the pre-existing leaf class, including the temporary document, with one of the two or more split leaf classes, the clustering being limited to documents associated with the pre-existing leaf class;

(iv) after the clustering, replacing the temporary document with the plurality of documents of the document group, each of the plurality of documents of the document group being associated with the same split leaf class with which the temporary document was associated by the clustering; and (v) one of:

(1) replacing the pre-existing leaf class with the two or more split leaf classes, said documents being associated with the two or more split leaf classes by the clustering, and (2) associating each split leaf class with the pre-existing leaf class such that the pre-existing leaf class is the immediate ancestor of each split leaf class, and removing all documents from the pre-existing leaf class, said documents being associated with the two or more split leaf classes by the clustering:

wherein the operations (ii), (iii), (iv), and (v) are performed by a processor configured to perform the operations (ii), (iii), (iv), and (v).

6. The method as set forth in claim 5, wherein the defining of a plurality of documents is repeated to define two or more document groups each of which is replaced by a temporary document prior to the clustering each temporary document being replaced by the plurality of documents of the corresponding document group after the clustering.

7. The method as set forth in claim 6, wherein the performing of clustering comprises:

associating the temporary document replacing each document group with a different split leaf class.

8. A probabilistic clustering system operating in conjunction with documents grouped into classes characterized by probabilistic model parameters indicative of word counts, ratios, or frequencies, the probabilistic clustering system comprising:

a user interface configured to receive a user selection of a change of association of one or more documents from one or more source classes to one or more destination classes; and a processor configured to locally update probabilistic model parameters characterizing classes affected by the changed association without updating probabilistic model parameters characterizing classes not affected by the changed association;

wherein the classes are organized into a hierarchy of classes with documents assigned to leaf classes of the hierarchy, the user interface is configured to receive a user selection to move a document or class from a source class or ancestor class to a destination class or ancestor class, and the processor is configured to (i) identify a common parent class that is a common ancestor for both the source class or ancestor class and the destination class or ancestor class, (ii) identify at least one intermediate ancestor class disposed in the hierarchy between the source class or ancestor class and the common parent class or disposed in the hierarchy between the destination class or ancestor class and the common parent class, and (iii) algebraically update probabilistic model parameters characterizing each intermediate ancestor class based on word counts of the moved document or class to reflect the moving of the document or class from the source class or ancestor class to the destination class or ancestor class.

9. The probabilistic clustering system as set forth in claim 8, wherein the user interface is configured to receive a user selection to move a single document from a source class to a destination class, and the processor is configured to algebraically update probabilistic model parameters characterizing the source class and the destination class based on word counts of the moved document to reflect removal of the document from the source class and addition of the document to the destination class, respectively.

10. The probabilistic clustering system as set forth in claim 8, wherein the classes are organized into a hierarchy of classes with documents assigned to leaf classes of the hierarchy, the user interface is configured to receive a user selection to merge two or more classes to be merged, said two or more classes having a common immediate ancestor class, and the processor is configured to algebraically combine probabilistic model parameters characterizing the two or more classes to be merged to generate probabilistic model parameters characterizing a merged class.

11. The probabilistic clustering system as set forth in claim 10, wherein the merged class is one of (i) a substitute class that replaces the two or more classes to be merged and (ii) a new ancestor class that is inserted between the two or more classes to be merged and a common ancestor of the two or more classes to be merged.

12. The probabilistic clustering system as set forth in claim 8, wherein the classes are organized into a hierarchy of classes with documents assigned to leaf classes of the hierarchy, the user interface is configured to receive a user selection to split a pre-existing leaf class into two or more split leaf classes, and the processor is configured to (i) perform clustering training to associate each document of the pre-existing leaf class with one of the two or more split leaf classes, the cluster training being limited to documents associated with the pre-existing leaf class and generating local probabilistic model parameters for characterizing the split leaf classes respective to the documents associated with the pre-existing leaf class and (ii) algebraically combine the local probabilistic model parameters of each split leaf class and the probabilistic parameters of the pre-existing leaf class to produce probabilistic model parameters characterizing the two or more split leaf classes respective to the documents of the probabilistic clustering system.

13. The probabilistic clustering system as set forth in claim 12, wherein the two or more split leaf classes one of (i) replace the pre-existing leaf class, and (ii) are arranged as immediate descendant classes of the pre-existing leaf class, the documents being removed from the pre-existing leaf class and associated with the two or more split leaf classes by the cluster training.

* * * * *